US006678702B1

(12) United States Patent
Mersch

(10) Patent No.: US 6,678,702 B1
(45) Date of Patent: Jan. 13, 2004

(54) METHOD FOR UPDATING DATA RECORDS IN COMMUNICATION SYSTEMS

(75) Inventor: Norbert Mersch, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/554,967
(22) PCT Filed: Nov. 3, 1998
(86) PCT No.: PCT/DE98/03203
§ 371 (c)(1),
(2), (4) Date: May 23, 2000
(87) PCT Pub. No.: WO99/29120
PCT Pub. Date: Jun. 10, 1999

(30) Foreign Application Priority Data

Nov. 27, 1997 (DE) .......................................... 197 52 640

(51) Int. Cl.[7] .............................................. G06F 17/30
(52) U.S. Cl. ...................................................... 707/201
(58) Field of Search .......................... 707/201, 10, 200; 709/201

(56) References Cited

U.S. PATENT DOCUMENTS

| 4,253,157 A | * | 2/1981 | Kirschner et al. | ....... 707/104.1 |
| 4,507,782 A | * | 3/1985 | Kunimasa et al. | .......... 714/748 |
| 5,809,503 A | * | 9/1998 | Aoshima | ........................ 707/8 |
| 5,924,095 A | * | 7/1999 | White | ........................ 707/10 |
| 5,937,413 A | * | 8/1999 | Hyun et al. | .................. 707/201 |
| 5,970,488 A | * | 10/1999 | Crowe et al. | ................... 707/8 |
| 5,974,429 A | * | 10/1999 | Strub et al. | ................. 707/203 |

FOREIGN PATENT DOCUMENTS

| DE | 41 25 389 C1 | 5/1992 |
| EP | 0 710 041 A2 | 5/1996 |

OTHER PUBLICATIONS

Gamel–Eldin et al., Local and Global Constraints in Database Integration, IEEE Proceedings of the Twenty–Second Annual Hawaii Inter., System Sciences, p. 604–611 vol. 2, Jan. 1989.*

* cited by examiner

*Primary Examiner*—Greta Robinson
(74) *Attorney, Agent, or Firm*—Fish & Richardson P.C.

(57) ABSTRACT

A method for updating data sets in communication systems splits the updating process into a two-stage method, whereby the first stage is out-sourced onto peripheral processors and the second stage is run on the central processor in order to achieve a more efficient updating. This relieves the central processors arranged in the traditional nodes of a communication network.

8 Claims, 2 Drawing Sheets

METHOD FOR UPDATING DATA RECORDS IN COMMUNICATION SYSTEMS

BACKGROUND OF THE INVENTION

The invention is directed to a method for updating data sets in a communication system having a number of nodes in which each node has data banks, a central processor, and a plurality of processors that exchange data on the basis of a standardized protocol.

Communication networks are formed by a plurality of nodes that are networked to one another via connecting lines. One or more communication systems are arranged in each node. Each of these communication systems usually comprises a data bank in which the system-proper data as well as data with respect to the network structure are stored. The latter includes subscriber-related data of the subscribers connected to the communication network. The subscriber-related data may be directed to the physical and logical connection data of the subscriber coming into consideration, the telephone number, the authorization, etc.

Since subscriber-related data are subject to constant modification, possibly due to changes from the subscriber himself as well as the addition of new subscribers, there is a need to constantly keep the subscriber-related data in the data banks of all nodes absolutely current. To accomplish this, these data are permanently exchanged with one another and an update of the data banks of all nodes is implemented as needed. Routing protocols serve this purpose. The PNNI routing protocol is an example of this. Via the PNNI routing protocol, the data of a data bank are sent to the data banks of all nodes in a broadcast manner which implement corresponding updates as needed.

The updating of the data sets in the data banks, however, requires extensive measures in practice that must be implemented in the communication systems. In the prior art, the data incoming via a connecting line are initially subjected to an extensive check for consistency and syntax in the central processor of the appertaining communication system and are compared to the data sets stored in the appertaining data bank. Based on the measure of this comparison, data sets that were not found are defined as new and supplied to the processors of the data bank, which subsequently undertake the write-in into the data bank. The problem with such a procedure is that the central processor may become overloaded and, consequently, far too much time may have elapsed (from dynamic points of view) the updating event has been completed.

German Patent DE 41 25 389 discloses a method for the modification of system configuration datasets in a long-distance switching system. For producing the data consistency in this method, security copies of the content of at least a part of the databases are produced, and administration and maintenance commands subsequently input into the system and modifying the database contents are listed in the time sequence of their occurrence in the form of command information. Each command information is supplemented with a database-individual information that indicates the execution of non-execution of the respective administration and maintenance command. Particularly in those instances in which peripheral function modules are decoupled from the system at times, as well as those in instances in which new peripheral function modules are coupled to the system for the first time at a later point in time, data consistency is established with this procedure. However, these tasks are also mainly implemented by the central processor.

SUMMARY OF THE INVENTION

The object of the invention is to provide a method that characterizes data to be exchanged by checking for syntax and/or consistency and is further checked for a first novelty (new to a local data bank) by the plurality of processors; only data that checks positive is handed to the central processor that checks for second (system-wide) novelty, and distributes this data to the other processor if this check is positive.

What is particularly advantageous about the invention is that the updating process is split into 2 stages. The first stage is run on the peripheral processors allocated to the data bank and is defined by a check event of the data for syntax and/or consistency as well as an initial novelty. When the criteria of this check are met, the data evaluated as positive are handed over to the central processor. The second stage runs on the central processor and is formed by a check event of these data for a second novelty. This involves the advantage that the central processor is relieved, in particular, of the involved syntax and consistency checking events that take up a great part of the time in the updating event.

Advantageous developments of the invention are discussed below.

BRIEF DESCRIPTION OF THE PREFERRED EMBODIMENTS

Figure 1:
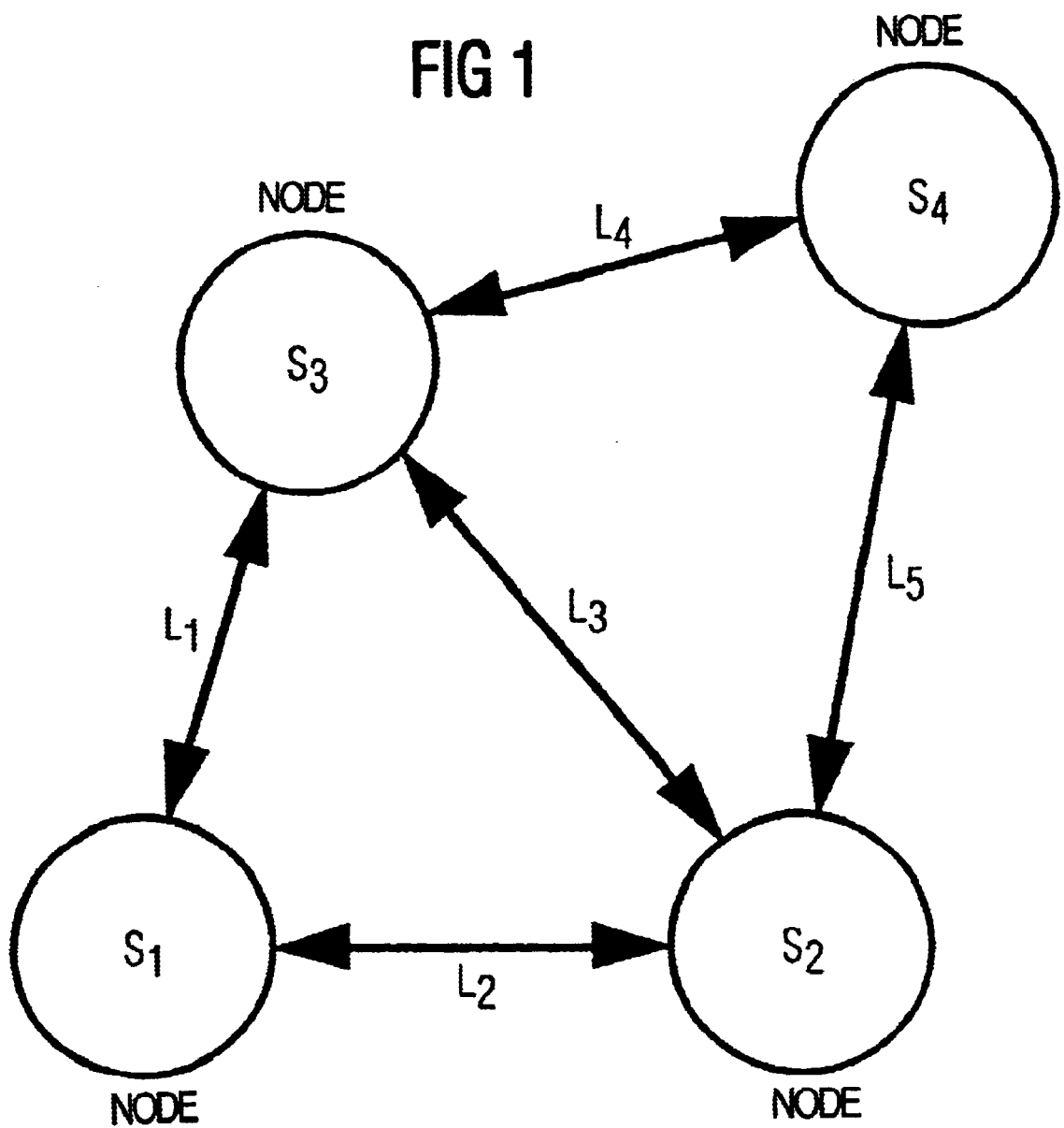
FIG. 1 is a block diagram showing a communication network formed by a plurality of nodes.

FIG. 1 shows a communication network that is formed by a plurality of nodes $S_1 \ldots S_4$. The limitation to a total of 4 nodes is exemplary and does not represent any limitation. In practice, a contemporary communication network of medium size may be composed of approximately 100 nodes. The nodes are connected to one another via connecting lines $L_1 \ldots L_5$. A respective communication system is arranged in each node. Each of these communication systems comprises a data bank DB in which subscriber-related data of all subscribers connected to the communication network are stored. These data are kept in the same state in the data banks of all communication systems.

Figure 2:
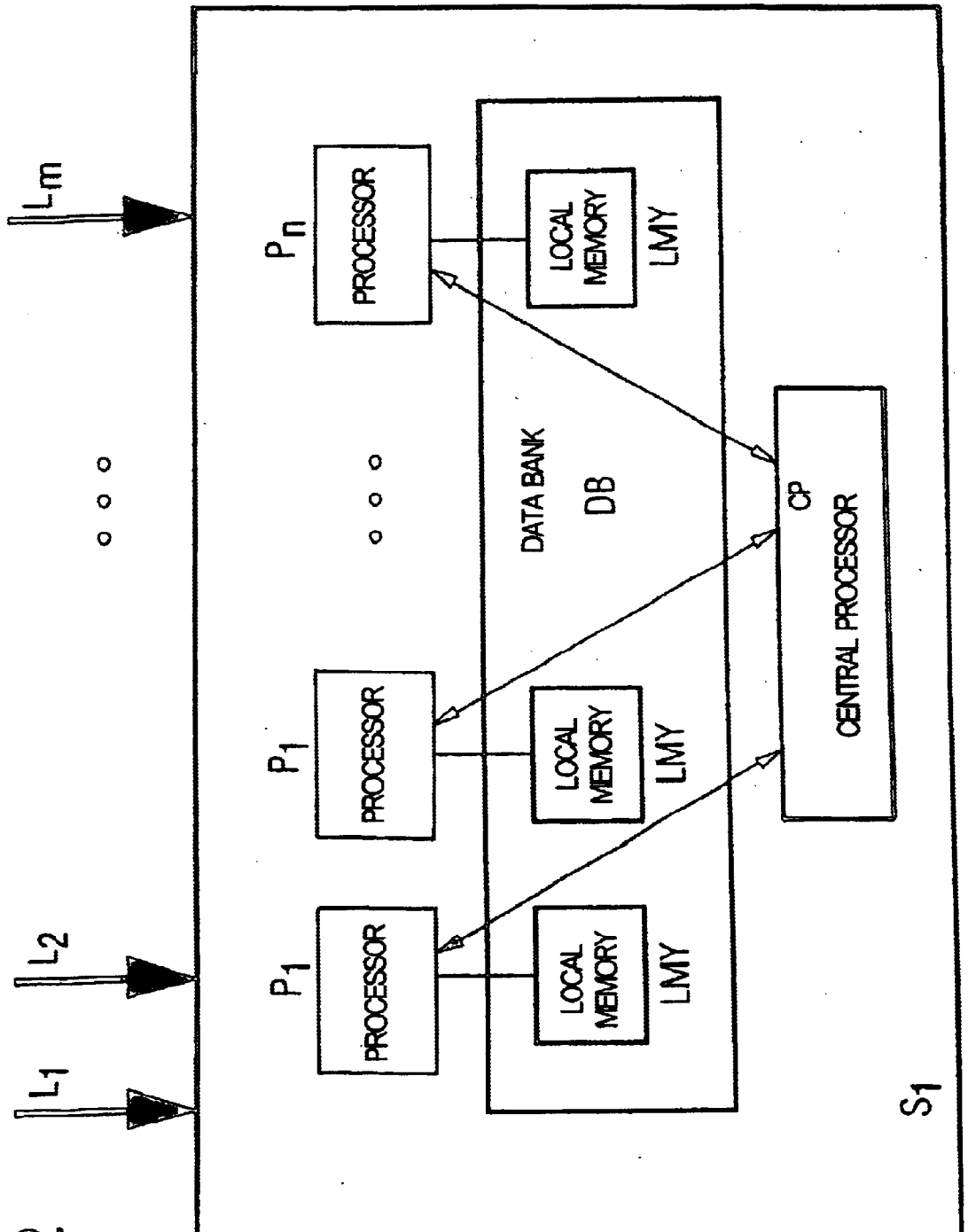
FIG. 2 is a block diagram showing the internal relationships of a node.

FIG. 2 shows the corresponding conditions in a node $S_1$ fashioned as communication system having central processor CP as well as a plurality of peripheral processors $P_1 \ldots P_n$. Each of the peripheral processors $P_1 \ldots P_n$ respectively has a plurality of transmission channels (routing protocol control channels) conducted via the connecting lines allocated to it. Further, a local memory LMY is respectively allocated to each of the processors $P_1 \ldots P_n$, whereby the local memories form a data bank DB in their totality. Subscriber-related data are stored in the data bank DB in addition to a multiple of other data. Connecting lines $L_1 \ldots L_m$ can also be derived from FIG. 2, with the subscriber-related data being supplied there over to the node $S_1$. The present exemplary embodiment assumes the number of connecting lines is 5.

It further assumes that subscribers connected to the node $S_4$ are given, for example, a different telephone, number and that further subscribers are connected here. A change of the data sets currently maintained in the data banks DB of all nodes $S_1 \ldots S_4$ is thus required. First, the subscriber data sets are updated in an appropriate way in the data bank DB arranged in the node $S_4$. Via the PNNI protocol, the content of the data bank DB of the node $S_4$ is then supplied in cyclical operation to the other nodes $S_1 \ldots S_3$ of the communication network.

If, for example, the data bank DB of the node $S_1$ is to be updated, it is thereby inventively provided that a syntax and consistency check of the incoming data sets is undertaken in the peripheral processors $P_1 \ldots P_n$. This check is thus displaced from the central processor CP onto the peripheral processor $P_1 \ldots P_n$. Since this part of the check takes up more than 50% of the time of the overall updating process, a clear relieving of the central processor CP is thus achieved. Further, a check is carried out in the peripheral processors $P_1 \ldots P_n$ to see whether the subscriber data set incoming at the moment is new, i.e., has not yet been stored in the data bank DB. When this is the case, this data set evaluated as new is supplied to the central processor. All data sets evaluated as new are thus available to the central processor CP for further processing. The peripheral processors $P_1 \ldots P_n$ thus exhibit a filter function. It should be noted that these data sets evaluated as new by the peripheral processors $P_1 \ldots P_n$ are only new in the sense that they were not formerly deposited in the data bank DB (first novelty).

The central processor CP now determines whether these data sets evaluated as new are also to be considered new system-wide (second novelty). Under certain circumstances, the case can occur that a new subscriber data set in the node $S_4$ is simultaneously supplied to the node $S_1$ via the connecting line $L_4$ and $L_1$ as well as via the connecting line $L_5$, $L_2$. Subsequently, these two, identically structured subscriber data sets are evaluated as new by the two peripheral processors $P_1$, $P_2$ independently of one another; this, however, only applies to the data bank DB, and it does not apply to the communication network. Whether this novelty is also valid system-wide can only be determined in the central processor CP.

When the central processor CP determines that the two data sets are identically structured and, thus, are not to be considered new system-wide, one of the two data sets is discarded. Subsequently, all of the data sets checked in this way are supplied again to the peripheral processors $P_1$ and $P_n$ that in turn update the data bank DB with these data sets. This further filter function implemented in the central processor CP thus assures is that a data set is only stored once per data bank.

Since the further filter function undertaken by the central processor CP is less complicated compared to the filter function implemented by the peripheral processors $P_1 \ldots P_n$, the central processor CP is relieved of these jobs resulting in greater speed. In particular, a transaction checking between the various data bank DB of the distributed data base can be avoided in the system, since the peripheral processors $P_1 \ldots P_n$ only access the memories LMY allocated to them and do not access a shared memory system that must then be exclusively reserved for one of the processors for each access.

It is provided in a further development of the invention that the data sets handed over to the other peripheral processors $P_1 \ldots P_n$ by the central processor CP be used as implicit acknowledgement, allowing a window flow mechanism to be realized. This means that only a limited plurality of data sets is made available to the central processor CP, and that the other pending data sets are intermediately stored in a waiting list. Only when a data set has returned from the central processor CP can a new data set be taken from the waiting list and potentially supplied to the central processor CP. The above-described method is illustrative of the principles of the present invention. Numerous modifications and adaptations thereof will be readily apparent to those skilled in this art without departing from the spirit and scope of the present invention.

What is claimed is:

1. A method for updating data in a communication network comprised of a node having a data bank, a plurality of peripheral processors, and a central processor which controls the peripheral processors, the method comprising:
   a first process performed by a peripheral processor, the first process comprising:
      checking the data for proper syntax and consistency,
      checking the data to determine if the data is new to the data bank; and
      transferring the data to the central processor if the data has the proper syntax and consistency and if the data is new to the data bank; and
   a second process performed by the central processor, the second process comprising:
      checking the data transferred from the peripheral processor to determine if the data is new to the communication network; and
      distributing the data to the peripheral processor if the data is new within the communication network.

2. A method according to claim 1 wherein checking the data for proper syntax and consistency comprises determining if the data is already present in a data bank.

3. A method according to claim 1, wherein checking the data transferred from the peripheral processor to determine if the data is new to the communication system comprises determining if the data is present in the communication network.

4. A method according to claim 1, further comprising:
   exchanging data between the peripheral processor and the central processor based on a standardized protocol;
   wherein the standardized protocol is the PNNI protocol.

5. A method according to claim 1, wherein delivery of the data from the central processor to the peripheral processor comprises delivery of implicit acknowledgment message.

6. A method according to claim 1, further comprising limiting, using a window flow mechanism, the data to be supplied to the central processor.

7. A method according to claim 1 wherein the data are subscriber-related data of all subscribers connected to the communication network.

8. A method according to claim 1, further comprising connecting a plurality of transmission channels using connecting lines allocated to the peripheral processor.

* * * * *